(12) United States Patent
Kato

(10) Patent No.: US 11,951,815 B2
(45) Date of Patent: Apr. 9, 2024

(54) WORK VEHICLE AND SYSTEM INCLUDING WORK VEHICLE

(71) Applicant: KOMATSU LTD., Tokyo (JP)

(72) Inventor: Yasunari Kato, Tokyo (JP)

(73) Assignee: KOMATSU LTD., Tokyo (JP)

( * ) Notice: Subject to any disclaimer, the term of this patent is extended or adjusted under 35 U.S.C. 154(b) by 1121 days.

(21) Appl. No.: 16/631,550

(22) PCT Filed: Jan. 11, 2019

(86) PCT No.: PCT/JP2019/000645
§ 371 (c)(1),
(2) Date: Jan. 16, 2020

(87) PCT Pub. No.: WO2019/159577
PCT Pub. Date: Aug. 22, 2019

(65) Prior Publication Data
US 2020/0181966 A1 Jun. 11, 2020

(30) Foreign Application Priority Data

Feb. 14, 2018 (JP) .................. 2018-024412

(51) Int. Cl.
*B60J 5/04* (2006.01)
*B60R 3/00* (2006.01)
(Continued)

(52) U.S. Cl.
CPC .................. *B60J 5/04* (2013.01); *B60R 3/00* (2013.01); *B62D 33/06* (2013.01); *E02F 9/16* (2013.01); *E05F 15/611* (2015.01)

(58) Field of Classification Search
CPC .. B60J 5/04; B60J 5/047; B62D 33/06; B62D 33/0617; E02F 9/16; E05F 15/40; E05F 15/41; E05F 15/44; E05F 15/611
(Continued)

(56) References Cited

U.S. PATENT DOCUMENTS 4,957,324 A * 9/1990 Doescher .............. E02F 9/0833
296/190.11
7,497,501 B2 * 3/2009 Seidel ................ B62D 33/0617
296/146.4
(Continued)

FOREIGN PATENT DOCUMENTS

CN 102536037 A 7/2012
CN 103184823 A 7/2013
(Continued)

*Primary Examiner* — Jason S Daniels
(74) *Attorney, Agent, or Firm* — Faegre Drinker Biddle & Reath LLP

(57) ABSTRACT

A wheel loader as a work vehicle includes a ladder, an operator's compartment, an actuator, an operation unit, and a controller. The operator's compartment has an openable and closable door disposed above the ladder. The actuator is disposed at the operator's compartment so as to actuate the door to make an opening motion. The operation unit receives an operation from an operator. The controller controls the drive of the actuator, based on an operation signal received from the operation unit, so that the door makes an opening motion while the operation unit is receiving an operation from the operator.

12 Claims, 11 Drawing Sheets

(51) Int. Cl.
*B62D 33/06* (2006.01)
*E02F 9/16* (2006.01)
*E05F 15/611* (2015.01)

(58) Field of Classification Search
USPC .......................................... 296/146.4, 190.11
See application file for complete search history.

(56) References Cited

U.S. PATENT DOCUMENTS

| | | |
|---|---|---|
| 2008/0150325 A1 | 6/2008 | Seidel |
| 2010/0058666 A1 | 3/2010 | Kim |
| 2014/0246262 A1 | 9/2014 | Mori et al. |
| 2015/0121655 A1 | 5/2015 | Lee |
| 2015/0283886 A1* | 10/2015 | Nania .................... E05F 15/73 49/31 |
| 2018/0100289 A1 | 4/2018 | Hamaguchi et al. |

FOREIGN PATENT DOCUMENTS

| | | |
|---|---|---|
| CN | 103842593 A | 6/2014 |
| CN | 104712214 A | 6/2015 |
| CN | 204476107 U | 7/2015 |
| CN | 204645952 U | 9/2015 |
| JP | H06-340215 A | 12/1994 |
| JP | H08-13544 A | 1/1996 |
| JP | H10-280806 A | 10/1998 |
| JP | 2005-273248 A | 10/2005 |
| JP | 3753177 B2 | 3/2006 |
| JP | 2009-155815 A | 7/2009 |
| JP | 2010-58785 A | 3/2010 |
| JP | 2017-43888 A | 3/2017 |
| KR | 10-2010-0071363 A | 6/2010 |
| KR | 10-2013-0087775 A | 8/2013 |

\* cited by examiner

WORK VEHICLE AND SYSTEM INCLUDING WORK VEHICLE

TECHNICAL FIELD

The present disclosure relates to a work vehicle and a system including a work vehicle.

BACKGROUND ART

For example, U.S. patent application No. 2008/0150325 (PTL 1) discloses a machine including an operator's compartment and a system for accessing the operator's compartment. The system for accessing the operator's compartment includes a door of the operator's compartment, an actuator that moves the door from the closed position to the open position, and an operator input unit that receives input from the operator for moving the door.

Japanese Patent Laying-Open No. 2017-43888 (PTL 2) discloses a work vehicle including an operator's compartment having a door, a detector that recognizes the operator, and a door actuator that automatically opens the door based on the detector recognizing the operator.

CITATION LIST

Patent Literature

PTL 1: U.S. patent application No. 2008/0150325
PTL 2: Japanese Patent Laying-Open No. 2017-43888

SUMMARY OF INVENTION

Technical Problem

As disclosed in the above PTLs 1 and 2, work vehicles are known in which the operator's compartment has a door that automatically moves from the closed position to the open position. The door automatically moves from the closed position to the open position in response to the operator pressing a switch. In such a work vehicle, the operator, when getting in and out of the operator's compartment, has to wait until the door fully opens. Further, when the door fully opens while the work vehicle is in a narrow space, the door may interfere with the nearby things. To address these problems, easy adjustment of the opening degree of the door has been required.

An object of the present disclosure is to solve the above-described problems. Specifically, an object of the present disclosure is to provide a work vehicle and a system including a work vehicle, in which the opening degree of the door can be easily adjusted.

Solution to Problem

A work vehicle according to the present disclosure includes a ladder, an operator's compartment, an actuator, an operation unit, and a controller. The operator's compartment has an openable and closable door disposed above the ladder. The actuator is disposed at the operator's compartment so as to actuate the door to make an opening motion. The operation unit receives an operation from an operator. The controller controls the drive of the actuator, based on an operation signal received from the operation unit, so that the door makes the opening motion while the operation unit is receiving an operation from the operator.

Advantageous Effects of Invention

The present disclosure provides a work vehicle and a system including a work vehicle, in which the opening degree of the door can be easily adjusted.

DESCRIPTION OF EMBODIMENTS

Figure 1:
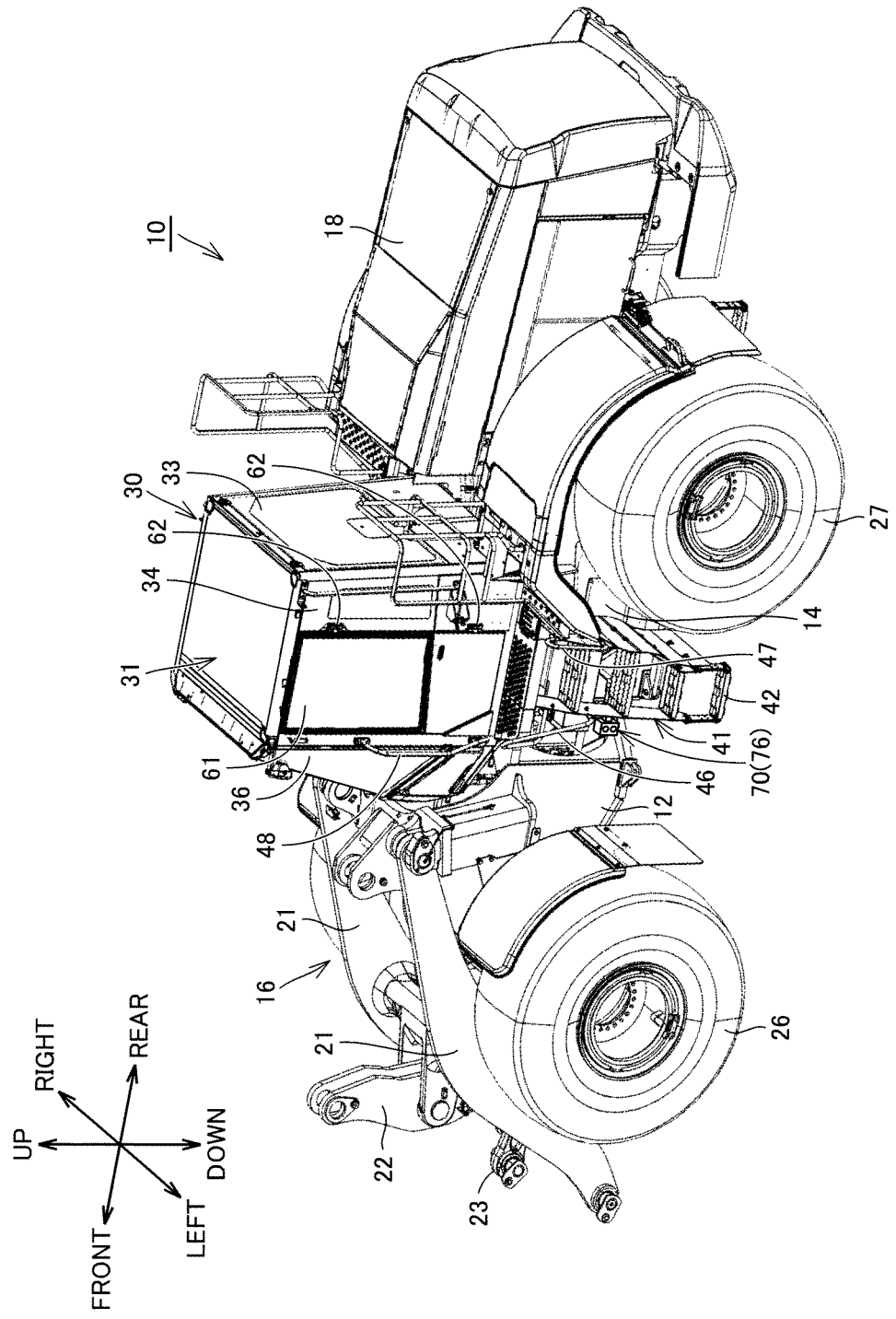
FIG. 1 is a perspective view showing a wheel loader in an embodiment of the present disclosure.

An embodiment of the present invention will now be described with reference to the drawings. In the drawings referred to hereinafter, identical or corresponding members are denoted by identical reference signs.

Figure 2:
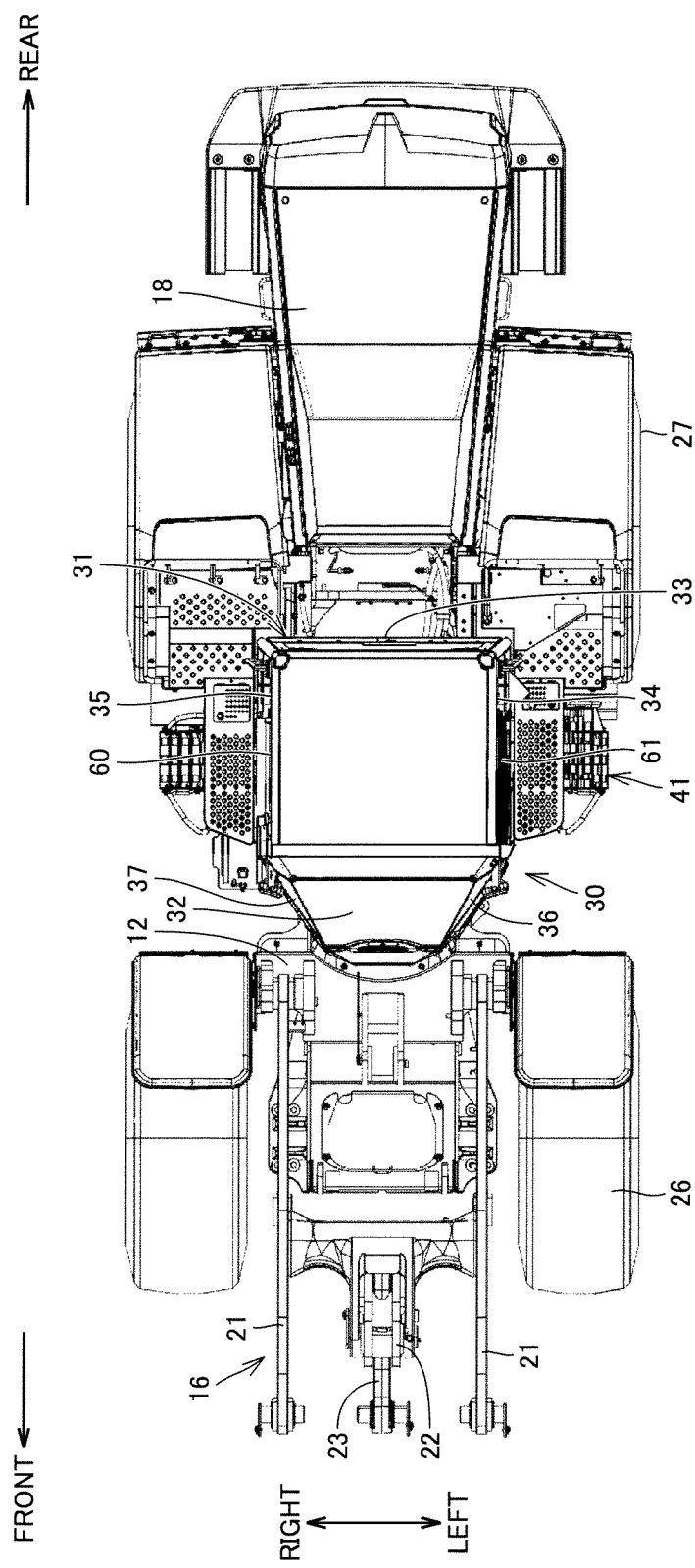
FIG. 2 is a top view showing the wheel loader.

FIG. 1 is a perspective view showing a wheel loader in an embodiment of the present disclosure. FIG. 2 is a top view showing the wheel loader.

First, the general configuration of a wheel loader 10 in the present embodiment is described. As shown in FIGS. 1 and 2, wheel loader 10 includes a front frame 12, a rear frame 14, front wheels 26, rear wheels 27, a work implement 16, an operator's compartment (cab) 30, and a rear structure 18.

In the following description, the longitudinal direction refers to the front-rear direction with respect to the operator seated on the operator's seat in operator's compartment 30. The front side refers to the front side with respect to the operator seated on the operator's seat and facing the front, and the rear side refers to the back side with respect to the operator seated on the operator's seat. The transverse direction refers to the right-left direction with respect to the operator seated on the operator's seat. The right and left sides respectively refer to the right and left sides with respect to the operator seated on the operator's seat and facing the front. The vertical direction refers to the direction orthogonal to a plane including the longitudinal direction and the transverse direction. The lower side refers to the ground side, and the upper side refers to the sky side.

Front frame 12 and rear frame 14 constitute the body frame having an articulated structure. Front frame 12 is disposed in front of rear frame 14. Front frame 12 is swingably connected to rear frame 14 via a center pin (not shown). Front frame 12 swings relative to rear frame 14 on a vertical axis.

Front frame 12 is coupled to rear frame 14 via steering cylinders (not shown). The steering cylinders are provided in pairs on the right and left. When the steering cylinders are driven to expand and contract, front frame 12 transversally swings on the above-mentioned center pin.

Front wheels 26 and rear wheels 27 are the running wheels of wheel loader 10. Front wheels 26 are disposed on front frame 12. The front wheels 26 are provided in pairs on the right and left. Rear wheels 27 are disposed on rear frame 14. The rear wheels 27 are provided in pairs on the right and left.

Work implement 16 is disposed on front frame 12. Work implement 16 includes a boom 21, a bucket (not shown), a boom cylinder (not shown), a bell crank 22, a bucket cylinder (not shown), and a link 23.

Operator's compartment 30 and rear structure 18 are disposed on rear frame 14. Operator's compartment 30 is disposed in the rear of work implement 16. Rear structure 18 is disposed in the rear of operator's compartment 30.

The operator operates wheel loader 10 from inside operator's compartment 30. Rear structure 18 includes, for example, a hydraulic oil tank, an engine, and a hydraulic pump. Front frame 12, rear frame 14, and rear structure 18 constitute the body of wheel loader 10.

The configuration of operator's compartment 30 will now be described. Operator's compartment 30 has a main body 31, a door (right) 60, and a door (left) 61.

Main body 31 defines the space inside operator's compartment 30. Main body 31 is formed by combining steel sheets and transparent windows. Doors 60 and 61 are openably and closably provided on main body 31. Door 60 is disposed on the right side of main body 31. Door 61 is disposed on the left side of main body 31.

Main body 31 has a hexagonal shape in top view. Main body 31 has a front face 32, a rear face 33, a right face 35, a left face 34, a diagonal front right face 37, and a diagonal front left face 36.

Front face 32 faces the front. Rear face 33 faces the rear. Front face 32 is shorter than rear face 33 in length in the transverse direction. Right face 35 faces the right. Right face 35 lies between front face 32 and rear face 33. Right face 35 is continuous with the right end of rear face 33. Left face 34 faces the left. Left face 34 lies between front face 32 and rear face 33. Left face 34 is continuous with the left end of rear face 33.

Diagonal front right face 37 faces the diagonal front right. Diagonal front right face 37 lies between front face 32 and right face 35. Diagonal front right face 37 is continuous with the right end of front face 32 and the front end of right face 35. Diagonal front left face 36 faces the diagonal front left. Diagonal front left face 36 lies between front face 32 and left face 34. Diagonal front left face 36 is continuous with the left end of front face 32 and the front end of left face 34. The distance between diagonal front right face 37 and diagonal front left face 36 in the transverse direction gradually decreases from the rear toward the front.

The shape of main body 31 of operator's compartment 30 in top view is not limited to a hexagonal shape but may be, for example, a rectangular shape.

Door 60 is disposed on right face 35. Door 60 is a manual door that is manually openable and closable. Door 61 is disposed on left face 34. Door 61 is an automatic door that is automatically openable and closable. Doors 60 and 61 are laterally symmetrical. Alternatively, right face 35 and left face 34 may have automatic and manual doors, respectively.

Figure 3:
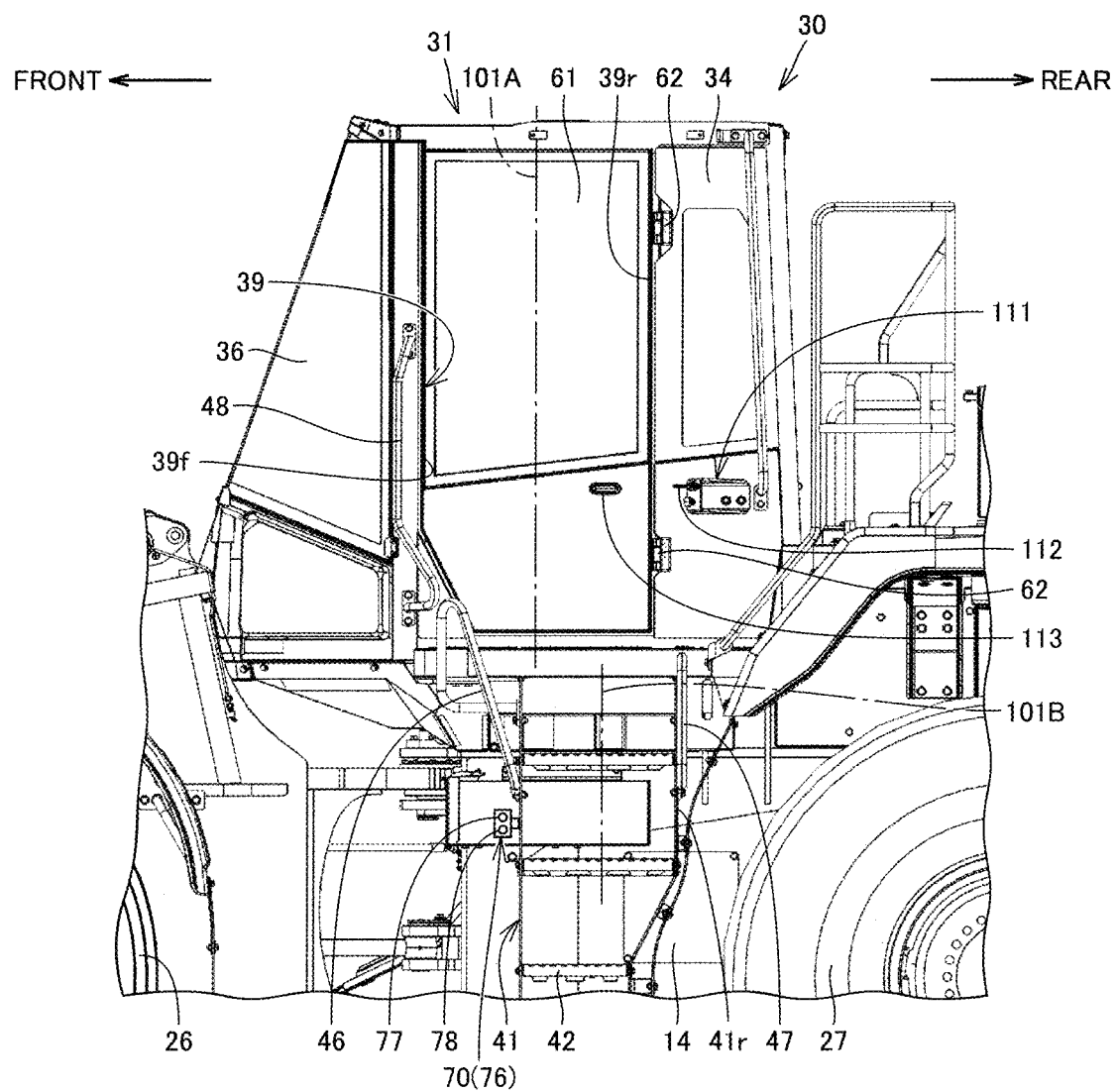
FIG. 3 is a left side view focusing on the part around the operator's compartment of the wheel loader.
Figure 4:
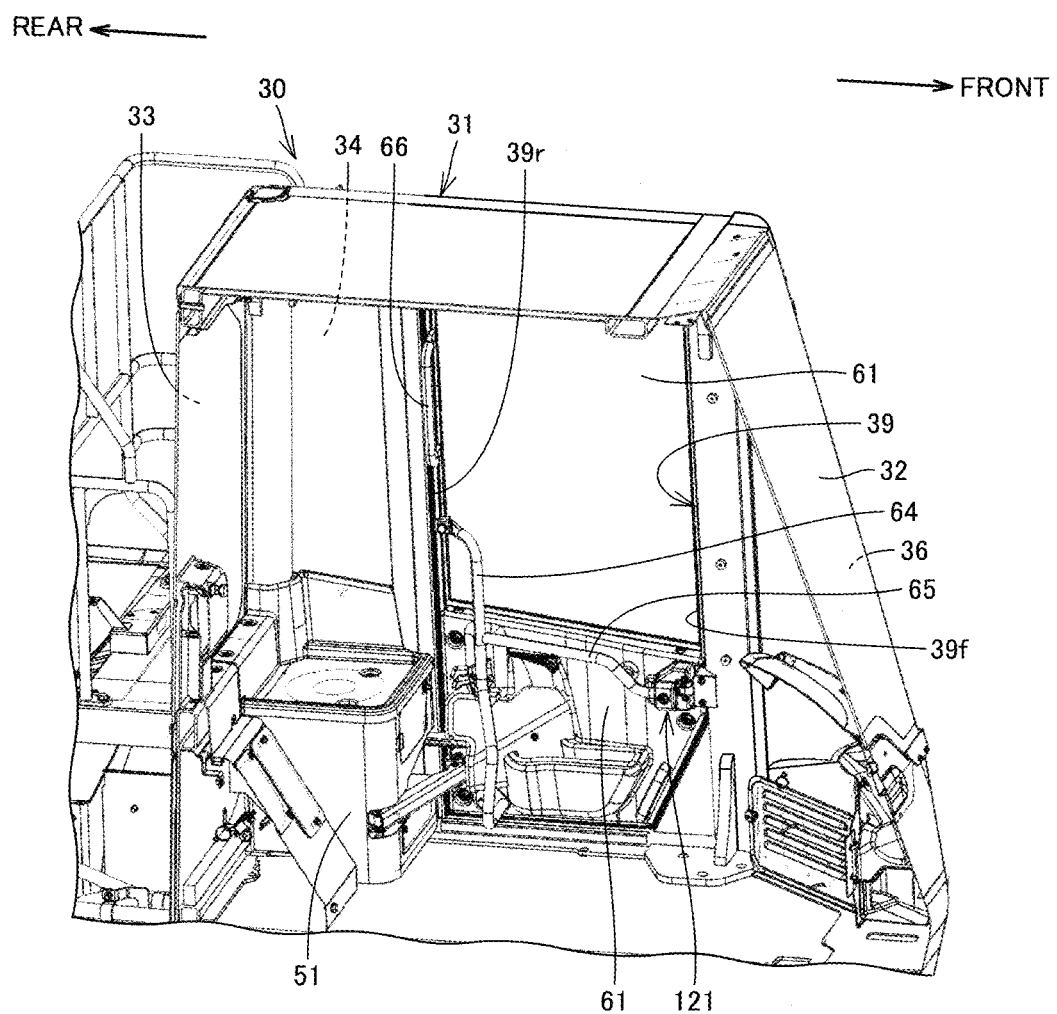
FIG. 4 is a perspective view of the operator's compartment seen from inside the compartment.
Figure 5:
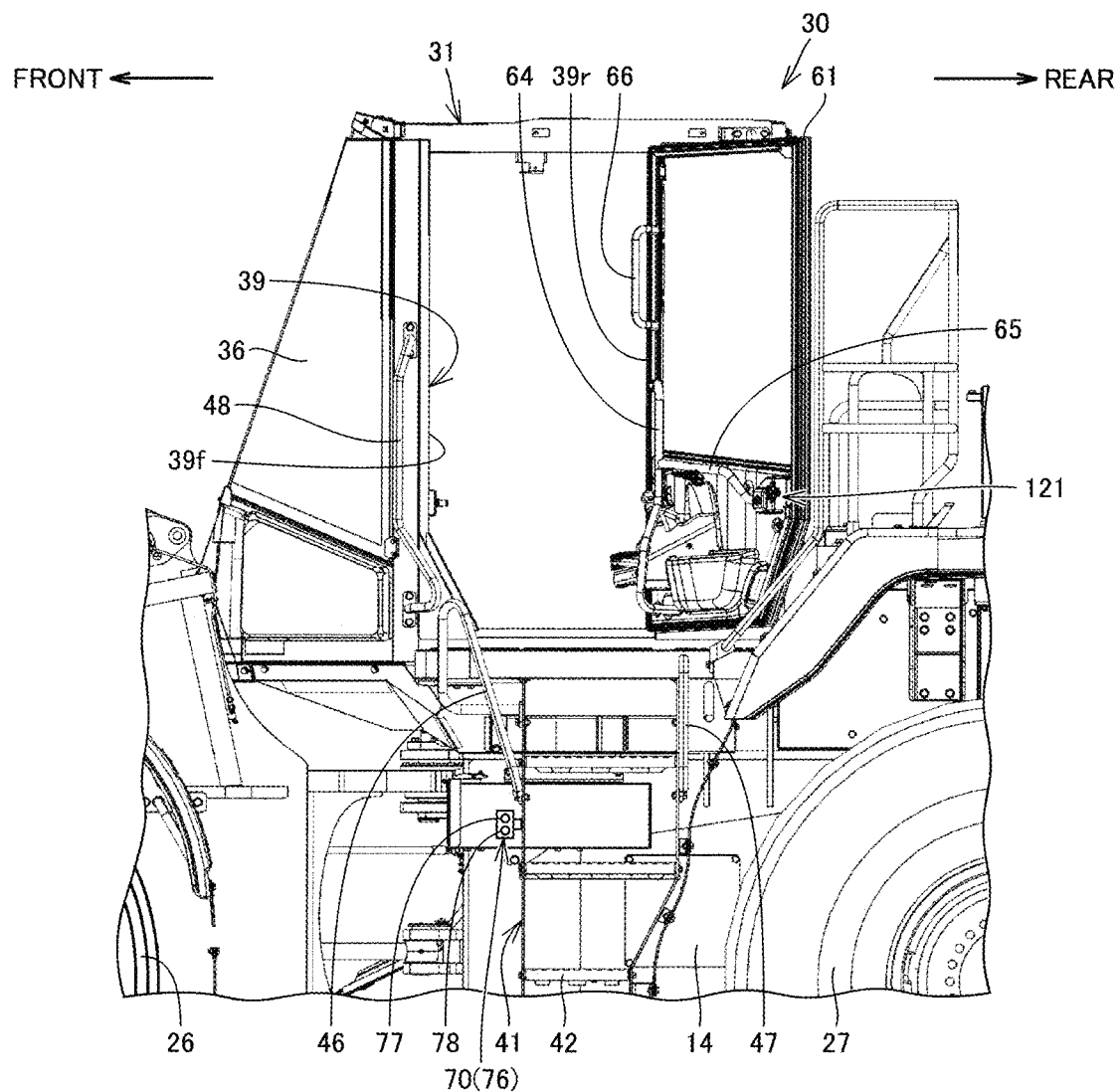
FIG. 5 is a left side view showing the part around the operator's compartment, with the door being in the open position.
Figure 6:
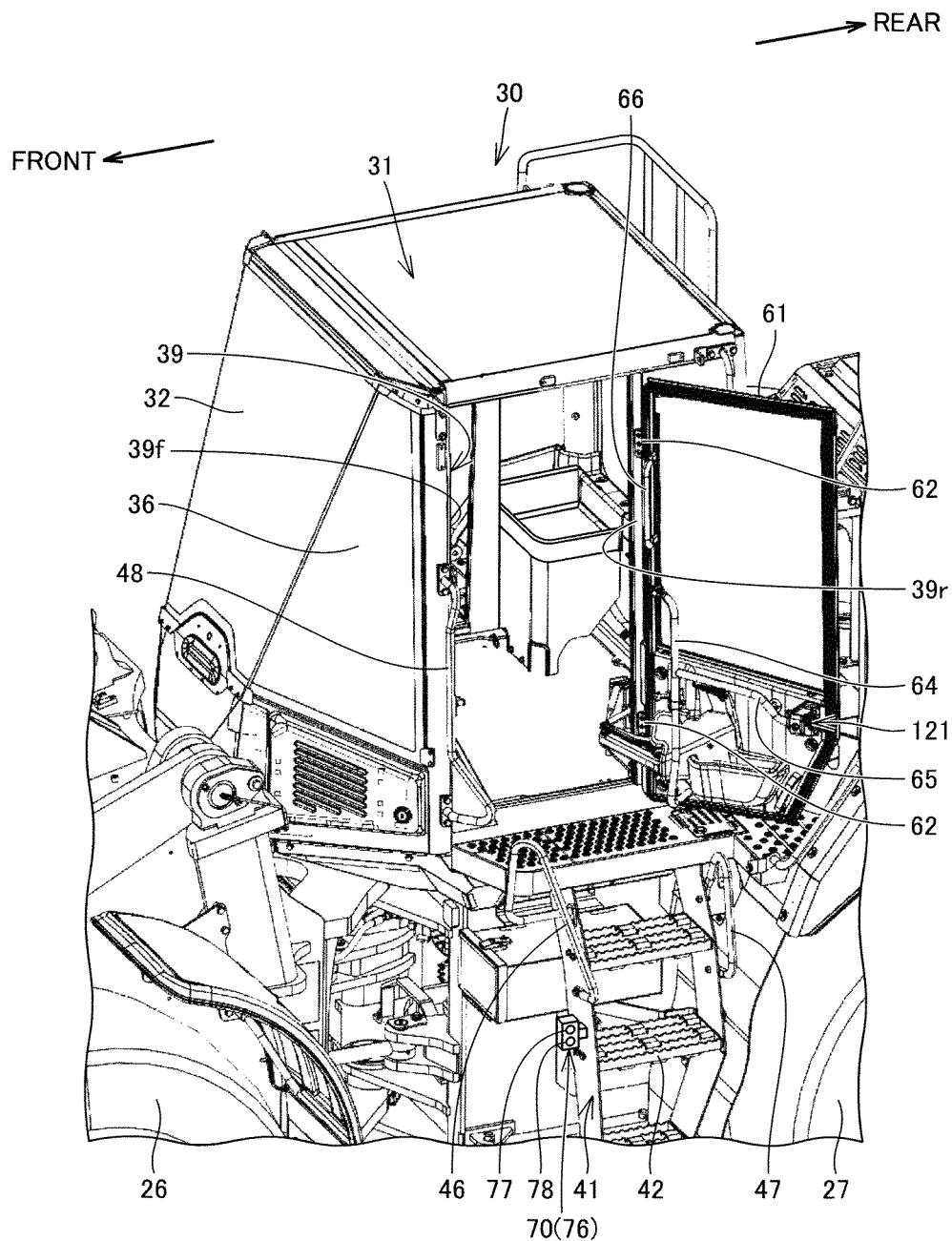
FIG. 6 is a perspective view showing the part around the operator's compartment, with the door being in the open position.

The configuration of automatic door 61 and the configuration around door 61 will now be described. FIG. 3 is a left side view focusing on the part around the operator's compartment of the wheel loader. FIG. 4 is a perspective view of the operator's compartment seen from inside the compartment. FIG. 5 is a left side view showing the part around the operator's compartment, with the door being in the open position. FIG. 6 is a perspective view showing the part around the operator's compartment, with the door being in the open position.

As shown in FIGS. 3 to 6, main body 31 has a doorway 39. Doorway 39 is an opening defined by main body 31, through which the operator gets in and out of operator's compartment 30. Doorway 39 is an opening generally in the shape of a rectangle whose long-side direction corresponds to the vertical direction. Doorway 39 is disposed on left face 34.

Doorway 39 has a doorway front end 39f and a doorway rear end 39r. Doorway front end 39f is the front end of the opening defined by doorway 39. Doorway front end 39f is the front long side of a pair of long sides, opposed to each other in the longitudinal direction, of the rectangular opening defined by doorway 39. Doorway rear end 39r is opposed to doorway front end 39f across the opening defined by doorway 39. Doorway rear end 39r is the rear end of the opening defined by doorway 39. Doorway rear end 39r is the rear long side of a pair of long sides, opposed to each other in the longitudinal direction, of the rectangular opening defined by doorway 39.

The whole doorway 39 is located above the center of rotation of front wheel 26. The whole doorway 39 is located above the topmost portion of front wheel 26. Doorway 39 is located between front wheel 26 and rear wheel 27 in the longitudinal direction.

Door 61 is disposed at doorway 39. Door 61 is movable between the closed position in which doorway 39 is closed (the position shown in FIGS. 3 and 4) and the open position in which doorway 39 is open (the position shown in FIGS. 5 and 6.

Door 61 has a hinge 62. Door 61 is swingably connected to doorway rear end 39r via hinge 62. Door 61 is swingable on hinge 62 between the closed position and the open position. Door 61 opens outward from operator's compartment 30. Door 61 is a rear hinge door having hinge 62 located on the rear side of doorway 39.

The swing angle of door 61 from the closed position to the open position is greater than 90°. Preferably, the swing angle of door 61 from the closed position to the open position is 120° or greater.

When door 61 is in the closed position, door 61 is in parallel with left face 34. When door 61 is in the open position, door 61 extends diagonally backward left from doorway rear end 39r. When door 61 is in the open position, door 61 is located on the rear side relative to doorway 39.

The door in the present disclosure may be a front hinge door having hinge 62 located on the front side of the doorway.

As shown in FIG. 3, wheel loader 10 further includes a ladder 41. Door 61 (operator's compartment 30) is disposed above ladder 41. Ladder 41 is located between front wheel 26 and rear wheel 27 in the longitudinal direction. The operator uses ladder 41 when going up and down between the ground and operator's compartment 30.

Ladder 41 is attached to rear frame 14. Ladder 41 has a step 42. A plurality of steps 42 are included in ladder 41.

Steps 42 serve as footholds so that the operator can put his foot on them. The plurality of steps 42 are disposed at intervals in the vertical direction As shown in FIGS. 3 to 6, wheel loader 10 further includes handrails 46, 47, 48, 64, 65, and 66.

The operator uses handrails 46, 47, 48, 64, 65, and 66 when going up and down between the ground and operator's compartment 30 and getting in and out of operator's compartment 30. Each of handrails 46, 47, 48, 64, 65, and 66 is in the form of a bar that can be grasped by the operator.

Handrails 46 and 47 are attached to ladder 41. Handrails 46 and 47 are opposed to each other across ladder 41 in the longitudinal direction. Handrail 46 is disposed on the front side relative to handrail 47.

Handrail 46 extends across between ladder 41 and door 61 in the height direction. Handrail 46 extends as inclining frontward from a position that coincides with ladder 41 to a position that coincides with door 61 in the height direction. Handrail 47 is disposed at a position that coincides with ladder 41 in the height direction. Handrail 47 extends along the vertical direction.

Handrail 48 is attached to main body 31. Handrail 48 is attached to left face 34. Handrail 48 is disposed on the front side relative to door 61. Handrail 48 is disposed at a position that coincides with door 61 in the height direction. Handrail 48 extends along the vertical direction. Handrail 48 is continuous from handrail 46 in the vertical direction.

As shown in FIG. 4, handrails 64, 65, and 66 are attached to door 61. Handrails 64, 65, and 66 are on the face of door 61 that will be disposed inside operator's compartment 30 when door 61 is in the closed position. Handrails 64 and 66 are adjacent to doorway rear end 39*r* in the longitudinal direction. Handrails 64 and 66 extend along the vertical direction. Handrail 65 extends along the horizontal direction.

As shown in FIGS. 5 and 6, when door 61 is in the open position, handrails 64, 65, and 66 are outside operator's compartment 30. Handrail 48 is opposed to handrails 64 and 65 across doorway 39 in the longitudinal direction. Handrail 64 is continuous from handrail 47 in the vertical direction. Handrail 66 is located at a distance from and above handrail 64.

As shown in FIG. 3, ladder 41 is shifted rearward relative to doorway 39 (door 61).

Specifically, center position 101B of ladder 41 in the longitudinal direction (at the part of ladder 41 that has the maximum width in the longitudinal direction) is shifted rearward relative to center position 101A of doorway 39 in the longitudinal direction (at the part of doorway 39 that has the maximum width in the longitudinal direction). Ladder rear end 41*r* is located on the rear side relative to doorway rear end 39*r*.

When the steering cylinders are driven to expand and contract to swing front frame 12 leftward, left front wheel 26 enters the space below doorway 39. At this time, left front wheel 26 does not interfere with ladder 41 because ladder 41 is shifted rearward relative to doorway 39.

Door 61 is a rear hinge door having hinge 62 located on the rear side of doorway 39. Rear hinge door 61 has the advantage of not blocking the operator's view when door 61 is open. However, door 61, when making an opening motion, swings rearward toward the location of ladder 41, thus making it difficult for an operator, especially of large build, to smoothly get in and out of operator's compartment 30. Accordingly, the swing angle of door 61 from the closed position to the open position is set to greater than 90°.

Figure 7:
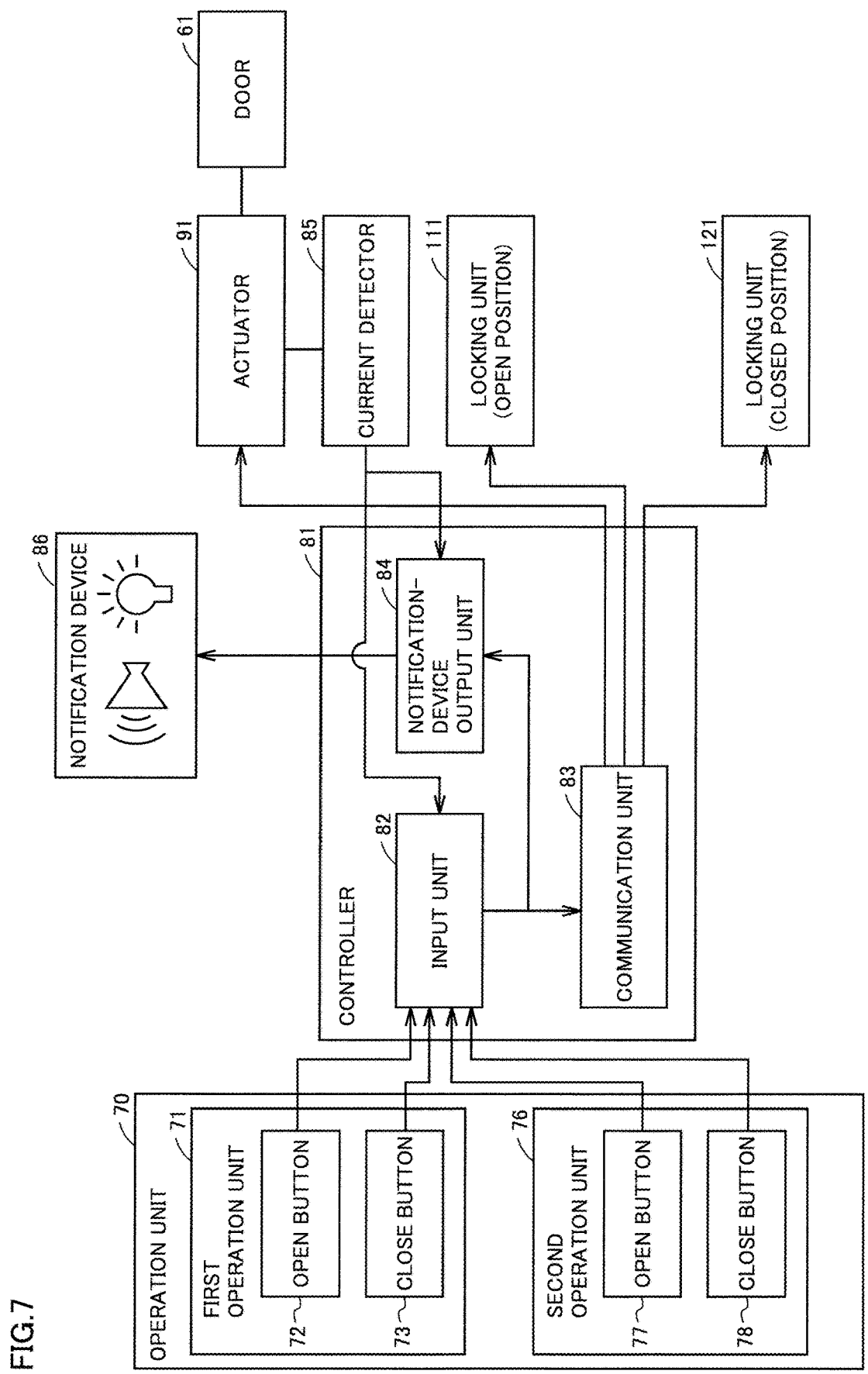
FIG. 7 is a block diagram showing a configuration for automatic opening and closing motions of the door in FIG. 3.

The configuration for automatic opening and closing motions of door 61 will now be described. FIG. 7 is a block diagram showing a configuration for automatic opening and closing motions of the door in FIG. 3.

As shown in FIG. 7, wheel loader 10 further includes an actuator 91, an operation unit 70, a locking unit (open position) 111, a locking unit (closed position) 121, and a controller 81.

Actuator 91 is coupled to door 61. Actuator 91 actuates door 61 to make an opening motion. The "opening motion" refers to a movement of door 61 from the closed side toward the open side. Actuator 91 also actuates door 61 to make a closing motion. The "closing motion" refers to a movement of door 61 from the open side toward the closed side. The configuration of actuator 91 will be described in detail later.

As shown in FIGS. 3 and 5 to 7, operation unit 70 is configured to receive an operation from the operator. Operation unit 70 is operated by the operator when the operator makes opening and closing motions of door 61. Operation unit 70 includes a first operation unit 71 and a second operation unit 76.

Second operation unit 76 is disposed outside operator's compartment 30. Second operation unit 76 is used when the operator makes opening and closing motions of door 61 from outside operator's compartment 30.

Second operation unit 76 includes an open button 77 and a close button 78. Open button 77 and close button 78 are push buttons to be pushed by the user. Open button 77 is a button for making an opening motion of door 61, and close button 78 is a button for making a closing motion of door 61.

Second operation unit 76 is disposed below door 61. Second operation unit 76 is disposed below operator's compartment 30. Second operation unit 76 is disposed at a position that coincides with ladder 41 in the height direction. Second operation unit 76 is disposed below handrails 46 and 47. Second operation unit 76 is attached to ladder 41. Second operation unit 76 is disposed on the front side relative to ladder 41. Second operation unit 76 is disposed at a height within the reach of an adult with a normal height standing on the ground.

Second operation unit 76 may be located anywhere outside operator's compartment 30. For example, second operation unit 76 may be disposed at a position that coincides with handrails 46 and 47 in the height direction. Second operation unit 76 may be disposed on the rear side relative to ladder 41. Second operation unit 76 may be attached to handrail 46, handrail 47, rear frame 14, or rear structure 18.

First operation unit 71 is disposed inside operator's compartment 30. First operation unit 71 is used when the operator makes opening and closing motions of door 61 from inside operator's compartment 30. Similar to second operation unit 76, first operation unit 71 includes an open button 72 for making an opening motion of door 61 and a close button 73 for making a closing motion of door 61.

As shown in FIGS. 3, 5, and 6, locking unit (open position) 111 is configured to hold door 61 in the open position. Locking unit 111 is disposed outside operator's compartment 30.

Locking unit 111 holds door 61 in the open position by fixing door 61 to a portion of main body 31 (left face 34) that is on the rear side relative to doorway 39.

Locking unit 111 includes a movable latch 112, a striker 113 engageable with latch 112, and an actuator (not shown) to actuate latch 112. When latch 112 is engaged with striker 113, door 61 is held in the open position (locking motion).

When the actuator is driven to disengage latch 112 from striker 113, door 61 is released from the open position (unlocking motion).

As shown in FIG. 4, locking unit 121 (closed position) is configured to hold door 61 in the closed position. Locking unit 121 is disposed inside operator's compartment 30. Locking unit 121 holds door 61 in the closed position by fixing door 61 to doorway front end 39*f*.

Similar to locking unit 111, locking unit 121 includes a movable latch, a striker engageable with the latch, and an actuator to actuate the latch.

As shown in FIGS. 3 to 7, controller 81 controls the drive of actuator 91 based on the operation signal received from operation unit 70 (first operation unit 71, second operation unit 76).

Controller 81 controls the drive of actuator 91 so that door 61 makes an opening motion while operation unit 70 (first operation unit 71, second operation unit 76) is receiving an operation from the operator. Controller 81 controls the drive of actuator 91 so that door 61 makes a closing motion while operation unit 70 (first operation unit 71, second operation unit 76) is receiving an operation from the operator.

Controller 81 controls the drive of the actuators in locking units 111 and 121 based on the operation signal received from operation unit 70 (first operation unit 71, second operation unit 76).

Specifically, controller 81 includes an input unit 82 and a communication unit 83. When door 61 is in the closed position, in response to the operator pressing open button 72 of first operation unit 71 or open button 77 of second operation unit 76, an operation signal for opening operation is inputted to input unit 82. Then, communication unit 83 outputs an instruction for unlocking motion to the actuator in locking unit 121. The operation signal for opening operation continues to be inputted to input unit 82 while the operator continues pressing open button 72 of first operation unit 71 or open button 77 of second operation unit 76. When the operator stops pressing open button 72 of first operation unit 71 or open button 77 of second operation unit 76, the operation signal for opening operation stops being inputted to input unit 82. While the operation signal for opening operation is being inputted to input unit 82, communication unit 83 outputs an instruction for opening motion to actuator 91.

When door 61 is in the open position, in response to the operator pressing close button 73 of first operation unit 71 or close button 78 of second operation unit 76, an operation signal for closing operation is inputted to input unit 82. Then, communication unit 83 outputs an instruction for unlocking motion to the actuator in locking unit 111. The operation signal for closing operation continues to be inputted to input unit 82 while the operator continues pressing close button 73 of first operation unit 71 or close button 78 of second operation unit 76. When the operator stops pressing close button 73 of first operation unit 71 or close button 78 of second operation unit 76, the operation signal for closing operation stops being inputted to input unit 82. While the operation signal for closing operation is being inputted to input unit 82, communication unit 83 outputs an instruction for closing motion to actuator 91.

As shown in FIGS. 3 and 7, when the operator is to get in operator's compartment 30, the operator makes an opening motion of door 61 by pressing open button 77 of second operation unit 76 from the ground. As shown in FIGS. 5 to 7, the operator goes up ladder 41 while grasping handrails 46 and 47 and handrails 48, 64, 65 in sequence. The operator gets in operator's compartment 30 through open doorway 39 while grasping handrail 66. From inside operator's compartment 30, the operator makes a closing motion of door 61 by pressing close button 73 of first operation unit 71.

As shown in FIGS. 4 and 7, when the operator is to get out of operator's compartment 30, the operator makes an opening motion of door 61 by pressing open button 72 of first operation unit 71 from inside operator's compartment 30. As shown in FIGS. 5 to 7, the operator gets out of operator's compartment 30 through open doorway 39 while grasping handrail 66. The operator goes down ladder 41 while grasping handrails 48, 64, 65 and handrails 46 and 47 in sequence. From the ground, the operator makes a closing motion of door 61 by pressing close button 78 of second operation unit 76.

When the operator is to get in and out of operator's compartment 30, the operator operates open button 72 or close button 73 of first operation unit 71 from inside operator's compartment 30, or operates open button 77 or close button 78 of second operation unit 76 from outside operator's compartment 30. Accordingly, the operator can stop door 61 at any intermediate position between the open position and the closed position. Thus, the operator can easily adjust the opening degree of door 61.

For example, an operator of small build would be able to smoothly get in and out of operator's compartment 30 with the opening degree of door 61 narrower (closer to the closed position) than the open position shown in FIGS. 5 and 6. In this case, the operator can shorten the time required for opening and closing door 61 and improve the usability of the handrails by narrowing the interval between handrail 48 and handrails 64 and 65 when going up and down ladder 41.

In particular, the swing angle of door 61 is set to greater than 90° in the present embodiment, which means that door 61 needs to swing a large angle between the open position and the closed position and takes a long time for the movement. Therefore, the above-described advantageous effect, easy adjustment of the opening degree of door 61, makes a great difference.

In some types of wheel loaders (in particular, small-sized wheel loaders), the outermost part of the wheel loader in the transverse direction may correspond to the location of open-position door 61. In this case, when the wheel loader works in a narrow space, door 61 may interfere with the nearby things. By contrast, wheel loader 10 is free from the restriction on its work area because the opening degree of door 61 can be easily adjusted so that door 61 will not interfere with the nearby things.

Further, since wheel loader 10 does not require sensors for controlling the opening and closing motions of door 61, wheel loader 10 can ensure high reliability in opening and closing motions of door 61 regardless of the work environment of wheel loader 10.

Operation unit 70 may include, for example, push levers, instead of the above-described push buttons. Alternatively, operation unit 70 may include RFID card readers, in which case door 61 may make opening and closing motions while the operator is passing his/her own RFID card over operation unit 70.

As shown in FIG. 7, wheel loader 10 further includes a current detector 85. Current detector 85 detects the supply current value to actuator 91. Current detector 85 is composed of, for example, a current sensor. The supply current value to actuator 91 detected by current detector 85 is inputted to input unit 82.

While the operator continues pressing open button 72 of first operation unit 71 or open button 77 of second operation unit 76, a current is supplied to actuator 91 to actuate door 61 to make an opening motion. While the operator continues pressing close button 73 of first operation unit 71 or close button 78 of second operation unit 76, a current is supplied to actuator 91 to actuate door 61 to make a closing motion. When door 61 reaches the open position or the closed position, door 61 is mechanically stopped. At this time, the load on actuator 91 increases, causing an increase in supply current to actuator 91.

Controller 81 determines whether or not the supply current value to actuator 91 detected by current detector 85 is equal to or more than a predetermined threshold value. If controller 81 determines that the supply current value to actuator 91 is equal to or more than the threshold value, communication unit 83 does not output an instruction for opening motion to actuator 91 even while the operation signal for opening operation is being inputted to input unit 82. If controller 81 determines that the supply current value to actuator 91 is equal to or more than the threshold value, communication unit 83 does not output an instruction for closing motion to actuator 91 even while the operation signal for closing operation is being inputted to input unit 82.

According to this configuration, the supply of electric power to actuator 91 can be automatically blocked when the door reaches the open position and the closed position, without requiring a mechanical sensor for detecting door 61 at the open position and the closed position. Further, if door 61 comes into contact with an obstacle lying at an intermediate position between the open position and the closed position, the motion of door 61 can be automatically stopped.

Controller 81 further includes a notification device 86 and a notification-device output unit 84. Notification device 86 is a device for notifying the operator of an opening or closing motion of door 61.

Notification device 86 is composed of, for example, a buzzer or indicator. At the time of an opening or closing motion of door 61, the buzzer sounds or the indicator turns on. When door 61 reaches the open or closed position, the buzzer stops sounding or the indicator turns off.

Notification-device output unit 84 controls the execution of the notification at notification device 86, based on the operation signal received from operation unit 70 (first operation unit 71, second operation unit 76), and based on the supply current value to actuator 91 detected by current detector 85.

While the operation signal for opening or closing operation is being inputted to input unit 82, notification-device output unit 84 instructs notification device 86 to execute the notification related to the opening or closing motion of door 61. If controller 81 determines that the supply current value to actuator 91 is equal to or more than the threshold value, notification-device output unit 84 does not instruct the execution of the notification related to the opening or closing motion of door 61 even while the operation signal for opening or closing operation is being inputted to input unit 82.

Figure 8:
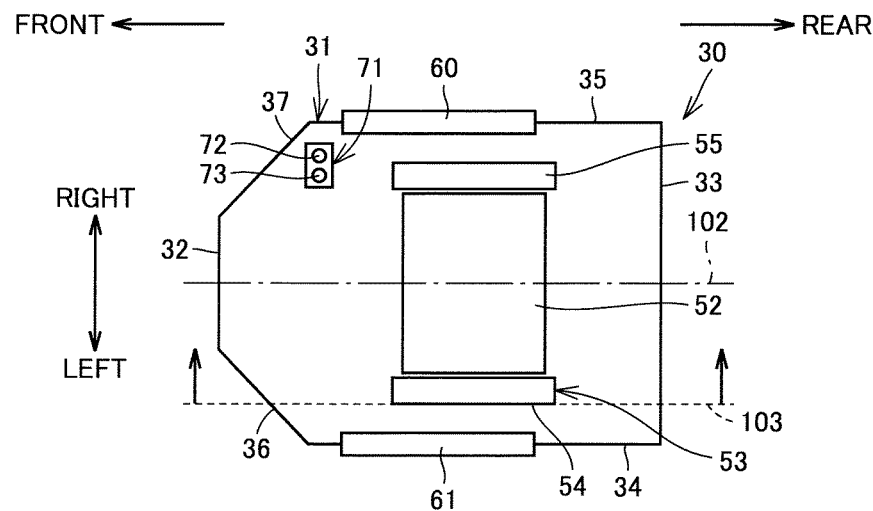
FIG. 8 is a top view schematically showing the internal configuration of the operator's compartment.
Figure 9:
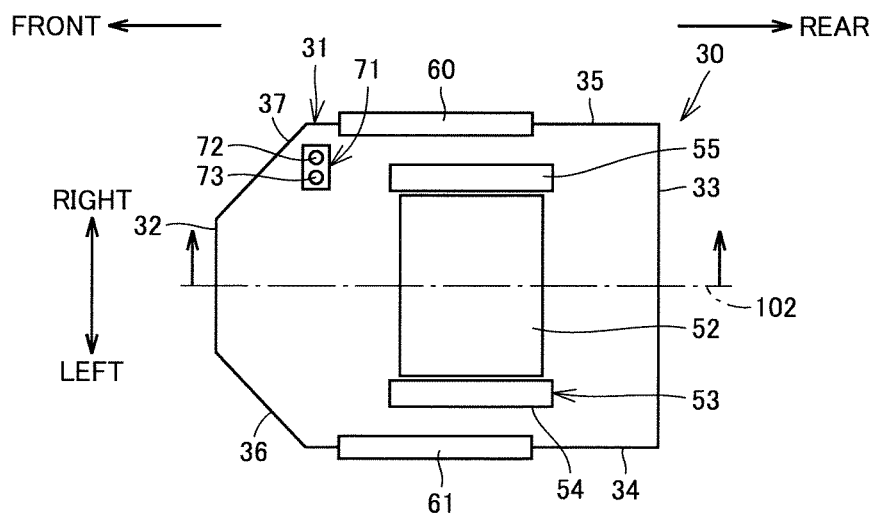
FIG. 9 is a top view schematically showing the internal configuration of the operator's compartment.

The location of first operation unit 71 inside operator's compartment 30 and the location of second operation unit 76 outside operator's compartment 30 will now be described. FIGS. 8 and 9 are top views schematically showing the internal configuration of the operator's compartment.

As shown in FIGS. 8 and 9, wheel loader 10 further includes an operator's seat 52, a console box (left) 53, and a console box (right) 55. Operator's seat 52, console box 53, and console box 55 are disposed inside operator's compartment 30.

The operator is seated on operator's seat 52 inside operator's compartment 30. Operator's seat 52 is disposed at the center of operator's compartment 30 in the transverse direction.

Each of console boxes 53 and 55 is a casing. Console box 53 is disposed between operator's seat 52 and left face 34 in the transverse direction. Console box 53 is disposed on the left face 34 side where automatic door 61 is disposed, relative to center position 102 between right face 35 and left face 34 in the transverse direction. Console box 55 is disposed between operator's seat 52 and right face 35 in the transverse direction. Console box 55 is disposed on the right face 35 side where manual door 60 is disposed, relative to center position 102 between right face 35 and left face 34 in the transverse direction.

The console boxes in the present disclosure may be casings that can contain things, or may be casings having equipment for operating the work vehicle (e.g., levers or buttons).

Console box 53 has an opposed surface 54. Opposed surface 54 faces leftward. Opposed surface 54 faces left face 34 where automatic door 61 is disposed, in the transverse direction.

As shown in FIG. 8, first operation unit 71 is preferably disposed on the right face 35 side where automatic door 61 is not disposed, relative to opposed surface 54 in the transverse direction (i.e., first operation unit 71 is preferably disposed in the region on the right side relative to dotted line 103 extending along opposed surface 54 in the longitudinal direction). As shown in FIG. 9, first operation unit 71 is preferably disposed on the right face 35 side where automatic door 61 is not disposed, relative to center position 102 between right face 35 and left face 34 in the transverse direction.

According to this configuration, first operation unit 71 is disposed remote from door 61 which makes opening and closing motions. Accordingly, the operator, when operating first operation unit 71, does not have to pay so much attention to door 61 which makes opening and closing motions. Thus, the operator can easily operate first operation unit 71.

For example, first operation unit 71 may be attached to the lower part of operator's seat 52, or to a pillar disposed at the corner between right face 35 and diagonal front right face 37, or to a storage box disposed on the rear side relative to operator's seat 52.

Figure 10:
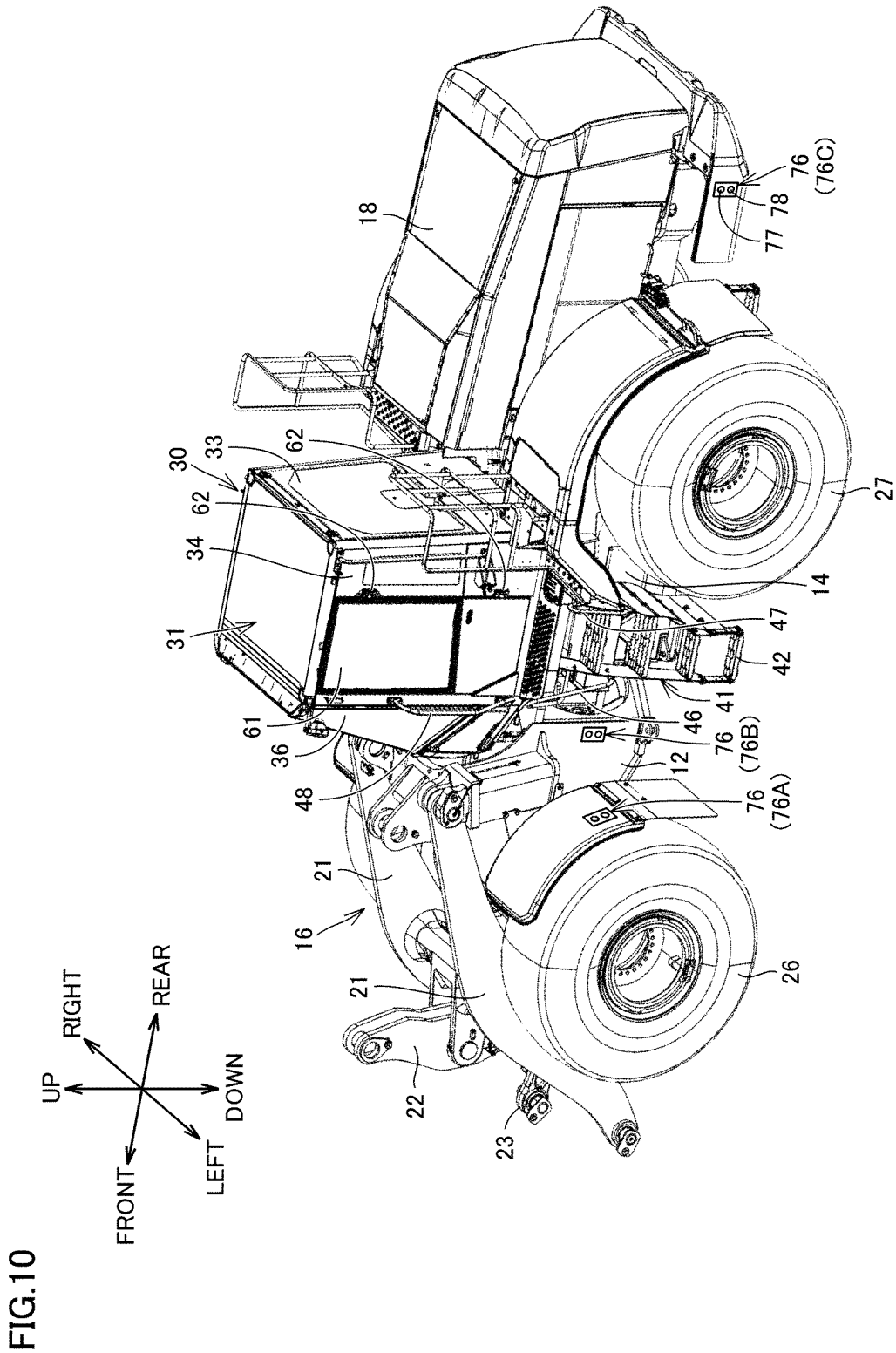
FIG. 10 is a perspective view showing variations of the location of the second operation unit.

FIG. 10 is a perspective view showing variations of the location of the second operation unit. As shown in FIG. 10, second operation unit 76 may be located at a distance from ladder 41 in the longitudinal direction, so that door 61 is visible from the operator who is operating second operation unit 76.

For example, second operation unit 76A is disposed on the tire guard covering front wheel 26. Second operation unit 76B is disposed on the wall surface of front frame 12. Second operation units 76A and 76B are located at a distance from ladder 41 in the front direction. Second operation unit 76C is disposed on the wall surface of rear frame 14. Second operation unit 76C is located at a distance from ladder 41 in the rear direction across rear wheel 27.

According to this configuration, even if second operation unit 76 is located at a distance from ladder 41 in the longitudinal direction, the operator can operate second operation unit 76 while viewing door 61 in opening and closing motions.

Figure 11:
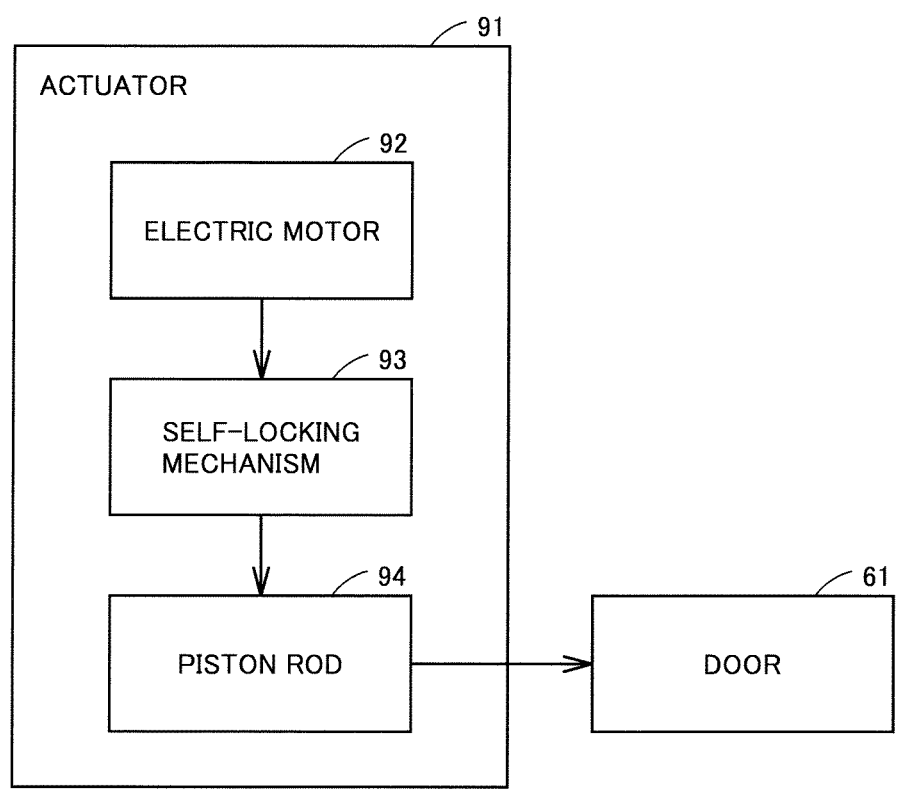
FIG. 11 is a block diagram showing the internal configuration of the actuator.

The configuration of actuator 91 will now be described. FIG. 11 is a block diagram showing the internal configuration of the actuator.

Actuator 91 is a direct acting actuator which can output a linear movement (linear back-and-forth movement). As shown in FIG. 4, actuator 91 is disposed at operator's compartment 30. Actuator 91 is disposed inside operator's compartment 30. Actuator 91 is stored in the lower space in storage box 51 disposed in the rear part of operator's compartment 30.

As shown in FIG. 11, actuator 91 is composed of an electric cylinder. Actuator 91 includes an electric motor 92 and a piston rod 94. Electric motor 92 serves as a motive power source that generates motive power. Piston rod 94 is driven to expand and contract by receiving the motive power from electric motor 92. Piston rod 94 serves as an output portion that outputs the motive power to door 61.

Electric motor 92 may be of a type that outputs a rotational movement by receiving the supply of electric power, or may be of a type that outputs a linear movement by receiving the supply of electric power (a so-called linear motor). Actuator 91 is not limited to an electric actuator that is driven by receiving the supply of electric power. Actuator 91 can be of any type that is driven by receiving instructions for opening and closing motions, e.g., a hydraulic actuator.

Actuator 91 further includes a self-locking mechanism 93. Self-locking mechanism 93 is configured to permit the transmission of motive power from electric motor 92 to piston rod 94, and limit the transmission of motive power from piston rod 94 to electric motor 92. Self-locking mechanism 93 is composed of a worm gear (reducer) built in electric motor 92.

The self-locking mechanism is not limited to the above-described worm gear, but may be composed of a trapezoidal thread for engaging the electric motor with the piston rod.

In some cases, the operator may get in and out of operator's compartment 30 while the opening degree of door 61 is at an intermediate position between the open position and the closed position. In such cases, self-locking mechanism 93 holds the opening degree of door 61 at the intermediate position between the open position and the closed position. Therefore, door 61 can be prevented from moving toward the open or closed position when the operator grasps handrail 64, 65, or 66. In other cases, the operator may get in and out of operator's compartment 30 while the opening degree of door 61 is at the open position. In such cases, locking unit 111 holds door 61 at the open position. Therefore, door 61 can be prevented from becoming unsteady when the operator grasps handrail 64, 65, or 66. Thus, the operator can easily get in and out of operator's compartment 30 regardless of the opening degree of door 61.

Figure 12:
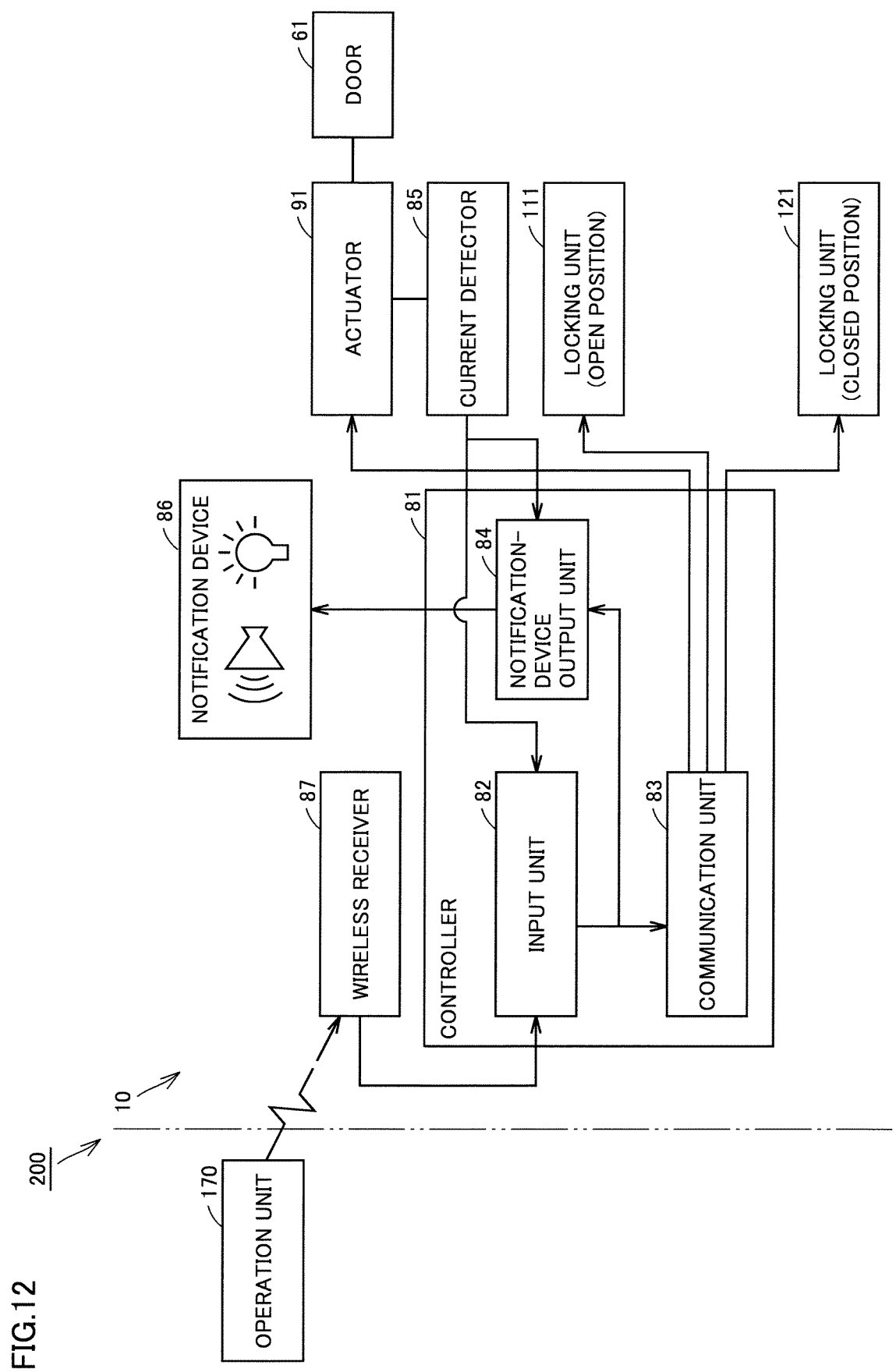
FIG. 12 is a block diagram showing the configuration of a system including the wheel loader.

FIG. 12 is a block diagram showing the configuration of a system including the wheel loader. The above embodiment describes a case in which wheel loader 10 (work vehicle) includes operation unit 70. However, operation unit 70 is not necessarily essential for wheel loader 10.

As shown in FIG. 12, a system 200 including wheel loader 10 has an operation unit 170, instead of operation unit 70 in FIG. 7. Operation unit 170 serves as a remote control, through which wheel loader 10 can be operated from a remote place. Wheel loader 10 further includes a wireless receiver 87. When the operator operates operation unit 170, an operation signal (wireless signal) is sent from operation unit 170 to wireless receiver 87 to be inputted to input unit 82. While the operator continues operating operation unit 170, the operation signal continues being inputted to input unit 82. When the operator stops operating operation unit 170, the operation signal stops being inputted to input unit 82. While the operation signal is being inputted to input unit 82, communication unit 83 outputs instructions for opening and closing motions to actuator 91.

The advantageous effects provided by wheel loader 10 in the present embodiment will now be enumerated.

Wheel loader 10 as a work vehicle includes ladder 41, operator's compartment 30, actuator 91, operation unit 70, and controller 81. Operator's compartment 30 has openable and closable door 61 disposed above ladder 41. Actuator 91 is disposed at operator's compartment 30 so as to actuate door 61 to make an opening motion. Opening operation unit 70 is configured to receive an operation from the operator. Controller 81 controls the drive of actuator 91, based on the operation signal received from operation unit 70, so that door 61 makes an opening motion while operation unit 70 is receiving an operation from the operator.

According to this configuration, at the time of opening motion of door 61, the operator can easily adjust the opening degree of door 61 by operating operation unit 70.

Actuator 91 actuates door 61 to make a closing motion. Controller 81 controls the drive of actuator 91, based on the operation signal received from operation unit 70, so that door 61 makes a closing motion while operation unit 70 is receiving an operation from the operator.

According to this configuration, at the time of closing motion of door 61, the operator can easily adjust the opening degree of door 61 by operating operation unit 70.

Operation unit 70 includes first operation unit 71 disposed inside operator's compartment 30, and second operation unit 76 disposed outside operator's compartment 30.

According to this configuration, when the operator is inside operator's compartment 30, the operator can easily adjust the opening degree of door 61 by operating first operation unit 71. When operator is outside operator's compartment 30, the operator can easily adjust the opening degree of door 61 by operating second operation unit 76.

Second operation unit 76 is located at a distance from ladder 41 in the longitudinal direction, so that door 61 is visible from the operator who is operating second operation unit 76.

According to this configuration, even if second operation unit 76 is located at a distance from ladder 41 in the longitudinal direction, the operator can operate second operation unit 76 while viewing door 61 in opening motion.

Operator's compartment 30 further includes main body 31 defining the space inside operator's compartment 30. Main body 31 has right face 35 and left face 34. Door 61 is disposed at left face 34 (first face), the first face being any one of right face 35 and left face 34. Wheel loader 10 further includes console box 53. Console box 53 is disposed inside operator's compartment 30. Specifically, console box 53 is disposed on the left face 34 side relative to center position 102 between right face 35 and left face 34 in the transverse direction. Console box 53 has an opposed surface 54 facing left face 34 in the transverse direction. First operation unit 71 is disposed on the right face 35 (second face) side relative to opposed surface 54 in the transverse direction, the second face being the other of right face 35 and left face 34.

According to this configuration, the operator can be remote from door 61 in opening motion, thus allowing the operator to easily operate first operation unit 71.

Main body 31 has doorway 39. Door 61 is swingably connected to doorway rear end 39r. Door 61 is swingable between the closed position and the open position. The closed position is a position in which doorway 39 is closed. The open position is a position in which doorway 39 is open and door 61 is located on the rear side relative to doorway 39. Wheel loader 10 further includes locking unit 111. Locking unit 111 holds door 61 at the open position.

According to this configuration, door 61 can be reliably held at the open position, thus allowing the operator to easily get in and out of operator's compartment 30 through doorway 39.

Door 61 is movable between the closed position in which doorway 39 is closed, and the open position in which doorway 39 is open. Actuator 91 includes electric motor 92 as a motive power source that generates motive power, piston rod 94 as an output portion that outputs motive power to door 61, and self-locking mechanism 93 that permits the transmission of motive power from electric motor 92 to piston rod 94 and limits the transmission of motive power from piston rod 94 to electric motor 92.

According to this configuration, door 61 can be reliably held at an intermediate position between the open position and the closed position, thus allowing the operator to easily get in and out of operator's compartment 30 through doorway 39.

Actuator 91 is an electric actuator that is driven by supply of electric power. Wheel loader 10 further includes current detector 85 that detects the drive current value of actuator 91. If the drive current value detected by current detector 85 is equal to or more than a threshold value, controller 81 stops the supply of electric power to actuator 91 even while operation unit 70 is receiving an operation from the operator.

According to this configuration, door 61 can be automatically stopped when door 61 reaches the open position or when door 61 comes into contact with an obstacle at an intermediate position between the open position and the closed position.

Wheel loader 10 further includes notification device 86 that notifies the operator that door 61 is making an opening motion. Controller 81 causes notification device 86 to execute the notification while operation unit 70 is receiving an operation from the operator. If the drive current value detected by current detector 85 is equal to or more than the threshold value, controller 81 causes notification device 86 to stop the notification even while operation unit 70 is receiving an operation from the operator.

According to this configuration, the operator can properly be notified not only that door 61 is making an opening motion but also that door 61 has been automatically stopped.

The present disclosure is applicable to various types of work vehicles that have an operator's compartment. The work vehicle in the present disclosure may be, for example, a bulldozer, a hydraulic excavator, a motor grader, a crane, or a forestry machine.

It should be understood that the embodiment disclosed herein is illustrative in every respect, not limitative. The scope of the present invention is defined not by the above description but by the terms of the claims, and is intended to include any modification within the meaning and scope equivalent to the terms of the claims.

INDUSTRIAL APPLICABILITY

The present disclosure is applicable to a work vehicle that includes an operator's compartment.

REFERENCE SIGNS LIST

10: wheel loader; 12: front frame; 14: rear frame; 16: work implement; 18: rear structure; 21: boom; 22: bell crank; 23: link; 26: front wheel; 27: rear wheel; 30: operator's compartment; 31: main body; 32: front face; 33: rear face; 34: left face; 35: right face; 36: diagonal front left face; 37: diagonal front right face; 39: doorway; 39*f*: doorway front end; 39*r*: doorway rear end; 41: ladder; 41*r*: ladder rear end; 42: step; 46, 47, 48, 64, 65, 66: handrail; 51: storage box; 52: operator's seat; 53, 55: console box; 54: opposed surface; 60, 61: door; 62: hinge; 70, 170: operation unit; 71: first operation unit; 72, 77: open button; 73, 78: close button; 76, 76A, 76B, 76C: second operation unit; 81: controller; 82: input unit; 83: communication unit; 84: notification-device output unit; 85: current detector; 86: notification device; 87: wireless receiver; 91: actuator; 92: electric motor; 93: self-locking mechanism; 94: piston rod; 101A, 101B, 102: center position; 111, 121: locking unit; 112: latch; 113: striker; 200: system

The invention claimed is:

1. A work vehicle comprising:
a ladder;
an operator's compartment having an openable and closable door disposed above the ladder;
an actuator disposed at the operator's compartment so as to actuate the door to make an opening motion;
an operation unit that receives an operation from an operator; and
a controller that controls drive of the actuator, based on an operation signal received from the operation unit, so that the door makes the opening motion while the operation unit is receiving the operation from the operator, and the door is stopped at any intermediate position between an open position and a closed position when the operator stops operating the operation unit.

2. The work vehicle according to claim 1, wherein
the actuator actuates the door to make a closing motion, and
the controller controls the drive of the actuator, based on the operation signal received from the operation unit, so that the door makes the closing motion while the operation unit is receiving the operation from the operator, and the door is stopped at any intermediate position between the open position and the closed position when the operator stops operating the operation unit.

3. The work vehicle according to claim 1, wherein the operation unit includes a first operation unit disposed inside the operator's compartment.

4. The work vehicle according to claim 3, wherein the operation unit further includes a second operation unit disposed outside the operator's compartment.

5. The work vehicle according to claim 4, wherein the second operation unit is located at a distance from the ladder in a longitudinal direction, so that the door is visible from the operator who is operating the second operation unit.

6. The work vehicle according to claim 3, wherein
the operator's compartment further includes a main body having a right face and a left face and defining a space inside the operator's compartment,
the door is disposed at a first face, the first face being any one of the right face and the left face,
the work vehicle further comprises a console box disposed inside the operator's compartment, the console box being disposed on a side of the first face relative to a center position between the right face and the left face in a transverse direction,
the console box has an opposed surface facing the first face in the transverse direction, and the first operation unit is disposed on a side of a second face relative to the opposed surface in the transverse direction, the second face being the other of the right face and the left face.

7. The work vehicle according to claim 1, wherein
the operator's compartment further includes a main body having a doorway and defining a space inside the operator's compartment,
the door is swingably connected to a rear end of the doorway,
the door is swingable between a closed position and an open position, the closed position being a position in which the doorway is closed, the open position being a position in which the doorway is open and the door is located on a rear side relative to the doorway, and
the work vehicle further comprises a locking unit that holds the door in the open position.

8. The work vehicle according to claim 1, wherein
the operator's compartment further includes a main body having a doorway and defining a space inside the operator's compartment,
the door is movable between a closed position in which the doorway is closed, and an open position in which the doorway is open, and
the actuator includes
a motive power source that generates motive power,
an output portion that outputs motive power to the door, and
a self-locking mechanism that permits transmission of motive power from the motive power source to the output portion, and limits transmission of motive power from the output portion to the motive power source.

9. The work vehicle according to claim 1, wherein the actuator is an electric actuator that is driven by supply of electric power.

10. The work vehicle according to claim 9, further comprising a current detector that detects a drive current value of the actuator, wherein
if the drive current value detected by the current detector is equal to or more than a threshold value, the controller stops the supply of electric power to the actuator even while the operation unit is receiving the operation from the operator.

11. The work vehicle according to claim 10, further comprising a notification device that notifies the operator that the door is making the opening motion, wherein
the controller causes the notification device to execute notification while the operation unit is receiving the operation from the operator, and
if the drive current value detected by the current detector is equal to or more than the threshold value, the controller causes the notification device to stop the notification even while the operation unit is receiving the operation from the operator.

12. A system comprising a work vehicle, the system including:
an operator's compartment having an openable and closable door;
an actuator disposed at the operator's compartment so as to actuate the door to make an opening motion;
an operation unit that receives an operation from an operator; and
a controller that controls drive of the actuator, based on an operation signal received from the operation unit, so that the door makes the opening motion while the operation unit is receiving the operation from the operator, and the door is stopped at any intermediate position between the open position and the closed position when the operator stops operating the operation unit.

* * * * *